(12) United States Patent
Nonaka et al.

(10) Patent No.: US 7,605,691 B2
(45) Date of Patent: Oct. 20, 2009

(54) COLLISION DETECTION SYSTEM

(75) Inventors: Toshihito Nonaka, Chiryu (JP); Shingo Wanami, Kariya (JP); Satoru Takehara, Obu (JP); Minoru Fujioka, Anjo (JP)

(73) Assignee: Denso Corporation, Kariya (JP)

( * ) Notice: Subject to any disclaimer, the term of this patent is extended or adjusted under 35 U.S.C. 154(b) by 430 days.

(21) Appl. No.: 11/585,321

(22) Filed: Oct. 23, 2006

(65) Prior Publication Data

US 2007/0103283 A1   May 10, 2007

(30) Foreign Application Priority Data

Nov. 4, 2005  (JP) ............................. 2005-320784

(51) Int. Cl.
*B60Q 1/00* (2006.01)
(52) U.S. Cl. .................. 340/436; 340/438; 340/425.5
(58) Field of Classification Search .............. 340/436, 340/425.5; 701/45
See application file for complete search history.

(56) References Cited

U.S. PATENT DOCUMENTS

| | | | |
|---|---|---|---|
| 4,220,950 A * | 9/1980 | Clark et al. ................ | 340/594 |
| 5,119,901 A * | 6/1992 | Buie .......................... | 180/274 |
| 5,748,075 A * | 5/1998 | Dirmeyer et al. ........... | 340/436 |
| 6,732,566 B2 * | 5/2004 | Roelleke et al. ............ | 73/12.08 |
| 7,025,163 B2 | 4/2006 | Fuertsch et al. | |
| 7,438,152 B2 * | 10/2008 | Hawes et al. ................ | 180/274 |
| 2004/0099462 A1 * | 5/2004 | Fuertsch et al. ............. | 180/274 |
| 2007/0181359 A1 | 8/2007 | Mader | |

FOREIGN PATENT DOCUMENTS

| | | |
|---|---|---|
| DE | 102 44 730 A1 | 4/2004 |
| DE | 103 31 862 A1 | 2/2005 |
| JP | 02-249740 | 10/1990 |

OTHER PUBLICATIONS

Office Action dated Dec. 3, 2007 in German Application No. 10 2006 048876.8-21 with English translation.

* cited by examiner

*Primary Examiner*—Toan N Pham
*Assistant Examiner*—Kerri McNally
(74) *Attorney, Agent, or Firm*—Harness, Dickey & Pierce, PLC

(57) ABSTRACT

A collision detection system for a vehicle is provided with multiple hollow members which are arranged at a periphery portion of the vehicle and define therein substantially closed spaces, at least one housing defining therein a substantially closed space, multiple transferring members for respectively communicating the spaces in the hollow members with the space in the housing, at least one detection unit which is arranged in the housing to detect a status of air in the housing, and a control unit. The control unit determines whether or not there occurs a collision of the vehicle based on detection signals from the detection unit.

16 Claims, 4 Drawing Sheets

COLLISION DETECTION SYSTEM

CROSS REFERENCE TO RELATED APPLICATION

This application is based on a Japanese Patent Application No. 2005-320784 filed on Nov. 4, 2005, the disclosure of which is incorporated herein by reference.

FIELD OF THE INVENTION

The present invention relates to a collision detection system, which can be suitably used for a vehicle, for example.

BACKGROUND OF THE INVENTION

Generally, a vehicle can be provided with a passenger protection device such as side airbags to protect passengers from a side collision between the vehicle side surface and an obstacle. The passenger protection device is actuated when the side collision has been detected. For example, as disclosed in JP-2-249740A, pressure sensors are provided to detect pressure variations (due to collision load) in closed spaces (air tanks) in side doors of the vehicle, and the side airbags are deployed based on detection signals of the pressure sensors.

A collision detection system according to a related art will be described with reference to FIG. 7. As shown in FIG. 7, doors 102-105 of a vehicle are respectively provided with side airbags 112-115 as the passenger protection device for the side collision. Pressure sensors 108a, 108b, 108c and 108d are respectively arranged in spaces defined in the doors 102-105 to detect inner pressures (which will vary due to side collision of vehicle) of the doors 102-105. Moreover, the pressure sensors 108a-108d are electrically connected with a collision detection ECU 109, respectively through wires 110a, 110b, 110c and 110d.

That is, in this case, the number of the pressure sensors is the same with that of the doors of the vehicle. Thus, it is also necessary to provide the pressure sensors with the wires which have the same number with the doors. Therefore, the cost of the collision detection system is increased.

SUMMARY OF THE INVENTION

In view of the above-described disadvantages, it is an object of the present invention to provide a collision detection system which can have a lowered cost by reducing a sensor number.

According to the present invention, a collision detection system for a vehicle has multiple hollow members each of which is arranged at a periphery portion of the vehicle and defines therein a substantially closed space, at least one housing which defines therein a substantially closed space, multiple transferring members for respectively communicating the spaces in the hollow members with the space in the housing, at least one detection unit which is arranged in the housing to detect a status of air in the housing, and a control unit for determining whether or not there occurs a collision of the vehicle based on detection signals from the detection unit.

When there occurs the collision at the periphery portion of the vehicle, the inner capacity of the hollow member in the vicinity of the collision portion varies. In this case, the variation of the air status of the space in the hollow member can be transferred into the housing through the transferring member, to be detected by the detection unit.

That is, the detection unit which is arranged in the housing can detect the air statuses in the multiple hollow members which are positioned at the vehicle periphery portion and communicated with the housing. Therefore, the number of the detection unit can be reduced to be smaller than that of the hollow members of the vehicle periphery portion. Furthermore, the number of wire through which the detection signals of the detection unit are sent to the control unit can be reduced. Accordingly, the cost can be lowered.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE EXAMPLE EMBODIMENTS

First Embodiment

A collision detection system according to a first embodiment of the present invention will be described with reference to FIGS. 1-4. The collision detection system can be suitably used for a vehicle, for example.

Figure 1:
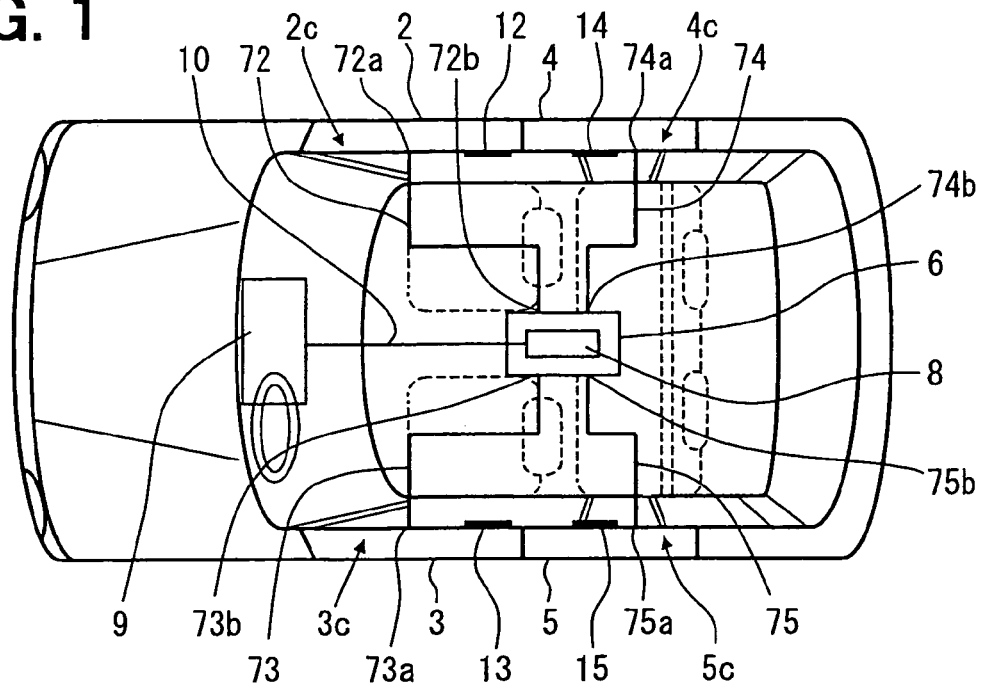
FIG. 1 is a schematic plan view showing a vehicle having a collision detection system according to a first embodiment of the present invention.

As shown in FIG. 1, the vehicle has multiple doors (e.g., four doors 2-5) positioned at a periphery portion of the vehicle to partially construct the vehicle side surfaces (right side surface and left side surface). Each of the doors 2-5 is provided with therein a substantially closed space 2c-5c to construct a hollow member. The doors 2 and 3 are respectively positioned at a right front portion and a left front portion of the vehicle. The doors 4 and 5 are respectively positioned at a right rear portion and a left rear portion of the vehicle. In this case, the vehicle left-right direction corresponds to the vehicle width direction, and the vehicle front-rear direction corresponds to the vehicle longitudinal direction.

The collision detection system is provided with a tube combination housing 6 (housing) which defines therein a substantially closed space 61, multiple transferring members (e.g., four transferring members 72-75) for respectively connecting the spaces 2c-5c in the doors 2-5 with the space 61 in the housing 6, a pressure detection unit 8 (e.g., pressure sensor) which is arranged in the space 61, and a control unit 9 (e.g., collision detection ECU) for determining whether or not there occurs a collision of the vehicle based on detection signals from the pressure detection unit 8. The transferring member 72-75 can be constructed of a tube, for example.

The vehicle is provided with a passenger protection device including multiple side airbags (e.g., four side airbags 12-15) or the like which are respectively attached to vicinities of the doors 2-5.

Figure 2:
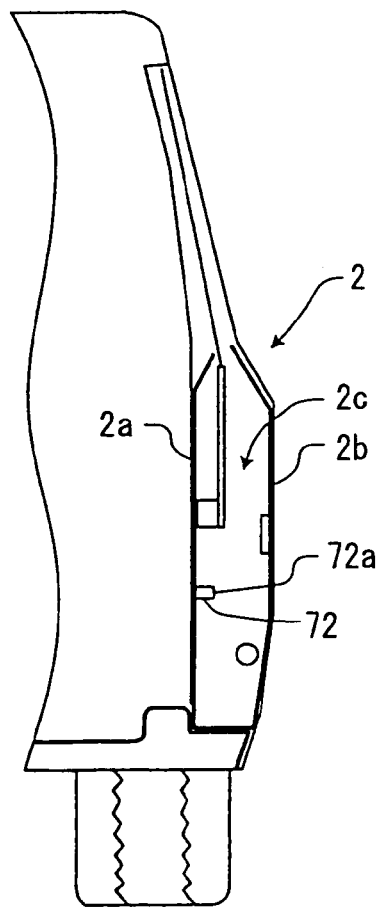
FIG. 2 is a schematic view showing an interior of a door of the vehicle according to the first embodiment.

As shown in FIG. 2, the door 2 has an inner panel 2a arranged at the inner side of the vehicle and an outer panel 2b positioned at the outer side of the vehicle. The substantially closed space 2c is arranged between the inner panel 2a and the outer panel 2b. Similarly, the doors 3-5 are also respectively provided with therein the substantially closed spaces 3c-5c.

Figure 3:
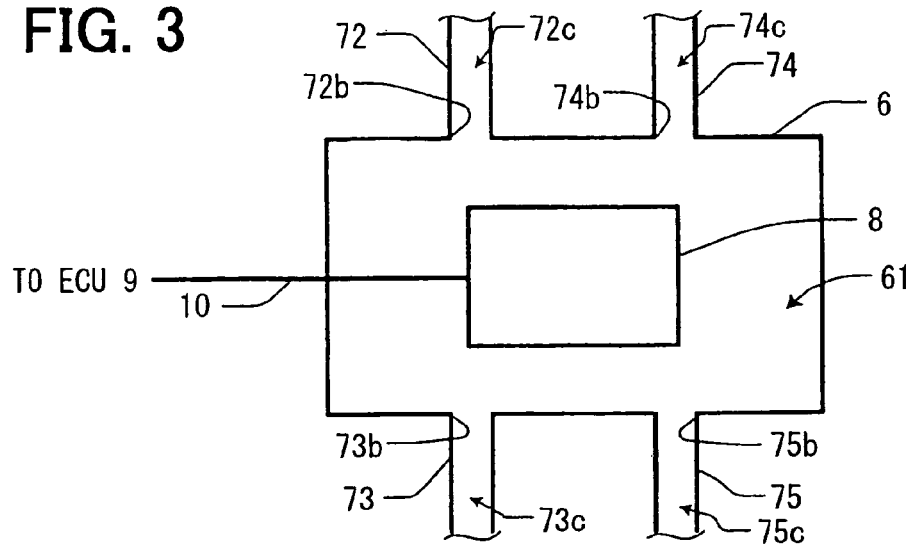
FIG. 3 is a schematic view showing an interior of a tube combination housing according to the first embodiment.

In this case, referring to FIGS. 2 and 3, each of the tubes 72-75 has two ends which are open. The tubes 72-75 are respectively provided with therein hollow portions 72c-75c, each of which is communicated with the two ends of the tube.

The tube 72 is connected with the door 2 and the housing 6, in such a manner that the opening ends 72a and 72b of the tube 72 respectively face (are communicated with) the space 2c of the door 2 and the space 61 of the housing 6.

Similarly, the tube 73 is connected with the door 3 and the housing 6, in such a manner that the opening ends 73a and 73b of the tube 73 respectively face (are communicated with) the space 3c of the door 3 and the space 61 of the housing 6.

The tube 74 is connected with the door 4 and the housing 6, in such a manner that the opening ends 74a and 74b of the tube 74 respectively face (are communicated with) the space 4c of the door 4 and the space 61 of the housing 6.

The tube 75 is connected with the door 5 and the housing 6, in such a manner that the opening ends 75a and 75b of the tube 75 respectively face (are communicated with) the space 5c of the door 5 and the space 61 of the housing 6.

The housing 6 can be arranged at a substantial center of the vehicle. The pressure sensor 8 arranged in the housing 6 is provided to detect the air pressure in the space 61 of the housing 6. The pressure sensor 8 can be provided with a sensing portion (not shown) of a semiconductor type or the like, a circuit portion (not shown) which generates electrical signals based on the pressure detected by the sensing portion, and a casing portion (made of resin, for example) for housing therein the sensing portion and the circuit portion. The circuit portion is electrically connected with the collision detection ECU 9 through a wire 10 or the like.

The collision detection ECU 9 can be constructed of a signal processing circuit in which a microcomputer is embedded. The collision detection ECU 9 receives the signals (which corresponds to air pressure in space 61 of the housing 6) through the wire 10 from the circuit portion of the pressure sensor 8, and determines whether or not there occurs a collision with the vehicle (e.g., vehicle side surface) based on the received signals.

For example, in the case where the pressure value detected by the pressure sensor 8 is larger than or equal to a predetermined threshold value, it is determined that there occurs the collision of the vehicle. Thus, the collision detection ECU 9 outputs a collision detection signal for deploying the side airbags 12-15, to an airbag ECU (not shown).

Next, a collision detecting process in the case of the collision at the door 2 will be described as an example.

Figure 4A:
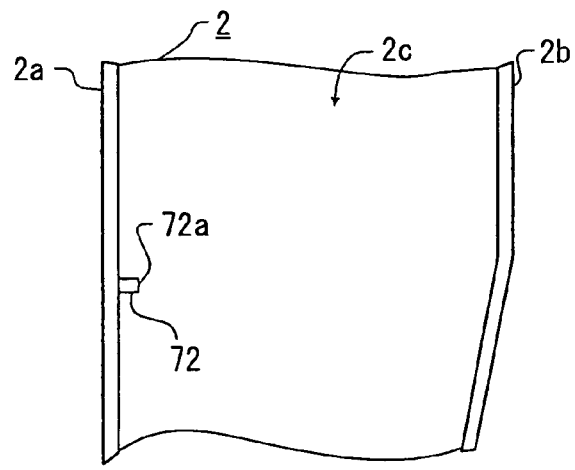
FIG. 4A is an enlarged schematic view showing the interior of the door in the case where no collision occurs according to the first embodiment.
Figure 4B:
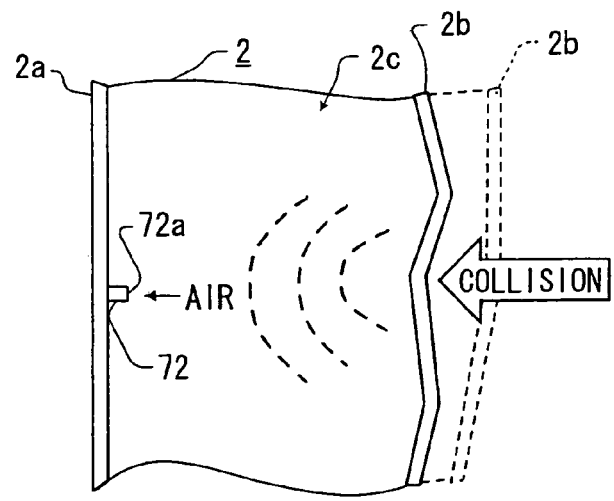
FIG. 4B is an enlarged schematic view showing the interior of the door in the case where a collision occurs according to the first embodiment.

FIG. 4A shows the door 2 before the collision occurrence, and FIG. 4B shows the door 2 after the collision occurrence. When there occurs the collision at the door 2, the outer panel 2b of the door 2 is deformed to become closer to the inner panel 2a as shown in FIG. 4B where the outer panel 2b before the collision is indicated by the broken line and that after the collision is indicated by the solid line. Thus, the inner capacity (volume) of the space 2c of the door 2 decreases so that the air pressure in the space 2c increases.

The air pressure in the space 2c of the door 2 can be transferred to the space 61 of the housing 6 through the tube 72, which is communicated with the space 2c at the end 72a and communicated with the space 61 at the end 72b.

In this case, the pressure sensor 8 generates the signals corresponding to the pressure variation detected by the sensing portion thereof, and sends the signals to the collision detection ECU 9 through the wire 10.

The collision detection ECU 9 determines that there occurs a collision (for example, side collision due to which vehicle-width-direction impact is applied to vehicle) of the vehicle, in the case where the pressure value detected by the pressure sensor 8 is larger than or equal to the predetermined threshold value.

Thus, the collision detection ECU 9 sends the collision detection signal to the airbag ECU, after determining the collision occurrence. Then, the airbag ECU outputs an actuation signal to the side airbags 12-15 so that the side airbags 12-15 are deployed to protect passengers from the collision.

On the other hand, in the case where the detected pressure value is smaller that the predetermined threshold value, the collision detection ECU 9 determines that there does not occur the collision of the vehicle. Thus, the collision detection signal is not sent to the airbag ECU, and the airbags 12-15 are not deployed.

As described above, the multiple transferring members 72-75 which have the tubular shape or the like are provided to transfer the air pressure variation of the spaces 2c-5c in the doors 2-5 to the space 61 in the housing 6. That is, the opening ends 72a-75a of the tubes 72-75 respectively face the spaces 2c-5c, and the opening ends 72b-75b of the tubes 72-75 face the space 61. Thus, the spaces 2c-5c in the doors 2-5 are communicated with the space 61 in the housing 6 respectively through the tubes 72-75, so that the pressure variation in the door 2-5 due to the collision occurred thereat can be substantially transferred to the interior of the housing 6.

The pressure sensor 8 arranged in the housing 6 detects the air pressure in the housing 6 and generates the corresponding signals. Therefore, the collision occurrence at the multiple doors 2-5 of the vehicle can be detected via the single pressure sensor 8.

In this case, the collision detection system has the single pressure sensor 8, and the single wire 10 for sending the signals from the pressure sensor 8 to the collision detection ECU 9. Moreover, the single housing 6 is provided, and the four tubes 72-75 are connected with the housing 6 to be combined. Therefore, the number of the components of the collision detection system is decreased, thus lowering the cost.

Second Embodiment

In the above-described first embodiment, the vehicle is provided with the single housing 6 and the single pressure detection unit 8 which is arranged in the housing 6. According to a second embodiment of the present invention, the multiple housings (e.g., two housings 6a and 6b) and the multiple pressure detection units (e.g., two pressure detection units 81 and 82) are provided. In this case, the number of the housings and that of the pressure sensors are smaller than the number of the doors of the vehicle, with reference to FIG. 5.

Figure 5:
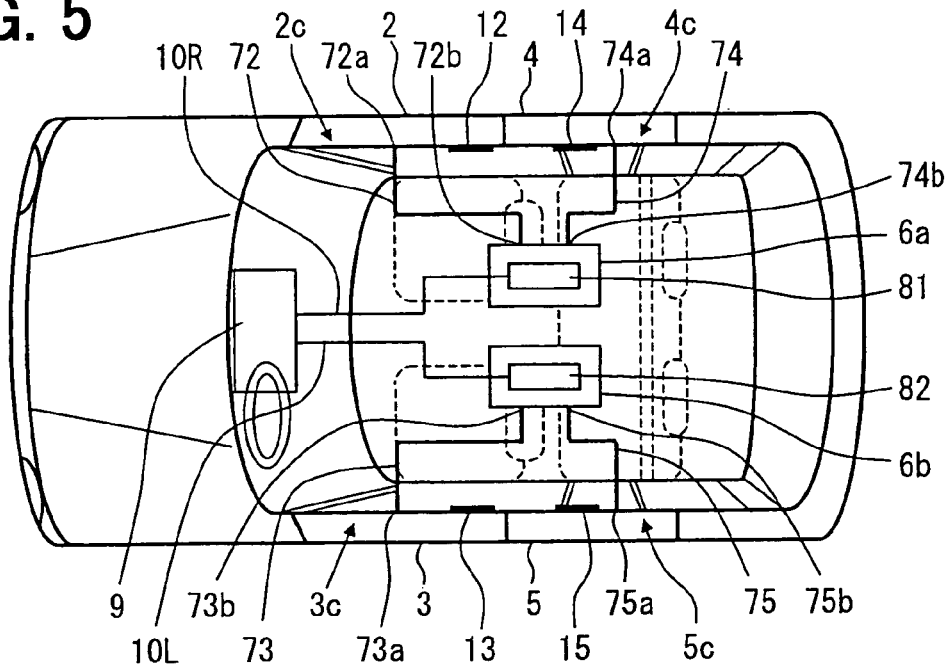
FIG. 5 is a schematic plan view showing a vehicle having a collision detection system according to a second embodiment of the present invention.
Figure 7:
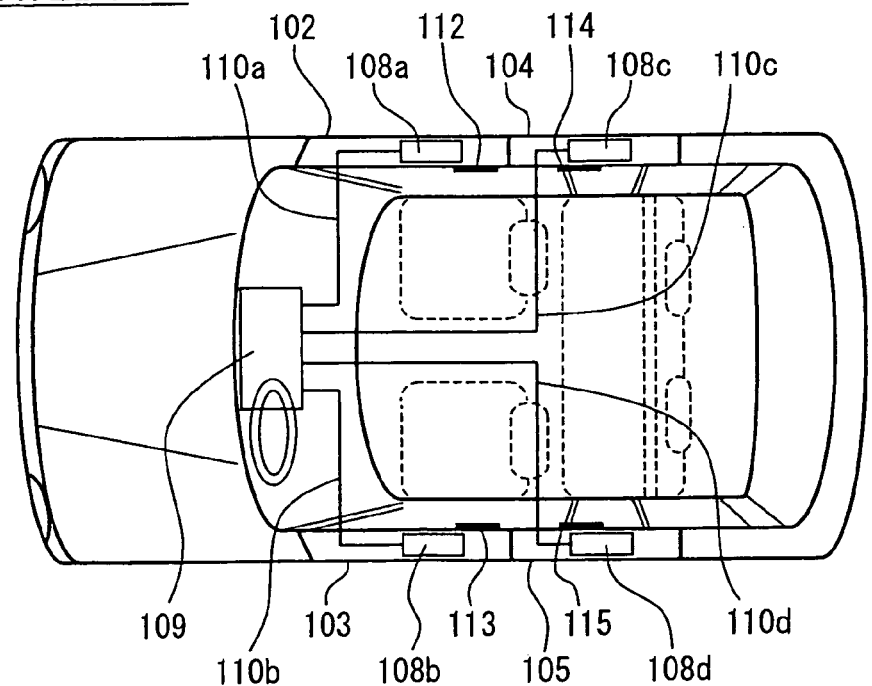
FIG. 7 is a schematic plan view showing a vehicle having a collision detection system according to a related art.

As shown in FIG. 5, the first housing 6a and the second housing 6b can be respectively arranged at a right portion and a left portion of the vehicle with respect to the vehicle width direction. Each of the housings 6a and 6b defines therein a substantially closed space 61a, 61b (not shown). The first pressure detection unit 81 and the second pressure detection unit 82 (e.g., pressure sensors) are respectively arranged in the spaces in the first housing 6a and the second housing 6b.

In this case, the two opening ends 72a and 72b of the tube 72 can be respectively communicated (connected) with the space 2c in the door 2 and the space 61a in the first housing 6a. The two opening ends 74a and 74b of the tube 74 can be respectively communicated (connected) with the space 4c in the door 4 and the space 61a in the first housing 6a.

On the other hand, the two opening ends 73a and 73b of the tube 73 are respectively communicated (connected) with the space 3c in the door 3 and the space 61b in the second housing 6b. The two opening ends 75a and 75b of the tube 75 are respectively communicated (connected) with the space 5c in the door 5 and the space 61b in the second housing 6b.

The pressure sensors 81 and 82 are electrically connected with the collision detection ECU 9, respectively through a wire 10R and a wire 10L or the like.

According to this embodiment, the pressure sensor 81 detects the air pressure in the first housing 6a which is connected with the doors 2 and 4, and outputs the corresponding signals to the collision detection ECU 9 through the wire 10R. In the case where the pressure value detected by the pressure sensor 81 is larger than or equal to a predetermined threshold value, the collision detection ECU 9 determines that there occurs a collision at the right side surface (where doors 2 and 4 are positioned) of the vehicle and sends a right collision detection signal to the airbag ECU (not shown). Thus, the airbag ECU outputs an actuation signal to the side airbags 12 and 14 which are arranged at the vicinities of the doors 2 and 4, so that only the side airbags 12 and 14 are deployed. In this case, the actuation signal for actuating the side airbags 13 and 15 which are arranged at the vicinities of the doors 3 and 5 is not outputted.

On the other hand, the pressure sensor 82 detects the air pressure in the second housing 6b and outputs the corresponding signal to the collision detection ECU 9 through the wire 10L. In the case where the pressure value detected by the pressure sensor 82 is larger than or equal to a predetermined threshold value, the collision detection ECU 9 determines that there occurs a collision at the left side surface (where doors 3 and 5 are positioned) of the vehicle and sends a left collision detection signal to the airbag ECU. Thus, the airbag ECU outputs an actuation signal to the side airbags 13 and 15, so that only the side airbags 13 and 15 are deployed. In this case, the actuation signal for actuating the side airbags 12 and 14 is not outputted.

According to this embodiment, the number of the housings (e.g., two housings 6a and 6b) and that of the pressure sensors (e.g., two pressure sensors 81 and 82) are smaller than the number of the doors (e.g., four doors 2-5) of the vehicle. The number of the tubes (e.g., four tubes 72-75) is the same with the doors of the vehicle. In this case, the pressure sensors share the detections of the air pressures in the spaces of the doors, which have the larger number than the pressure sensors. Correspondingly, the housings are share-connected with the tubes, which have the larger number than the housings. That is, the housings are shared by the tubes, to be respectively connected with the different tubes.

Therefore, the collision occurrence at the vehicle side surface can be detected via the pressure sensors with the smaller number than that of the doors of the vehicle. Therefore, the cost can be lowered.

Moreover, according to this embodiment, the collision can be determined based on the signals from the first pressure sensor 81 for detecting the air pressures of the spaces in the doors 2 and 4 of the vehicle right side, and the second pressure sensor 82 for detecting the air pressures of the spaces in the doors 3 and 5 of the vehicle left side. Therefore, it becomes possible to selectively actuate only the airbags of the right side or those of the left side, where the collision occurrence has been determined.

About the collision detection system, what has not been described in the second embodiment is the substantially same with the first embodiment.

Third Embodiment

A third embodiment of the present invention will be described with reference to FIGS. 6A and 6B. In this case, the collision detection system is further provided with multiple flow detection units.

According to this embodiment, a valve member 72d and an opening/closing detection member 72e construct the flow detection unit for detecting the air flow from the space 2c of the door 2 toward the housing 6. Similarly, a valve member 73d and an opening/closing detection member 73e, a valve member 74d and an opening/closing detection member 74e, a valve member 75d and an opening/closing detection member 75e respectively construct the flow detection units for detecting the air flow from the spaces 3c-5c of the doors 3-5 toward the housing 6. The opening/closing detection members 72e-75e can be constructed of switches, for example.

Figure 6A:
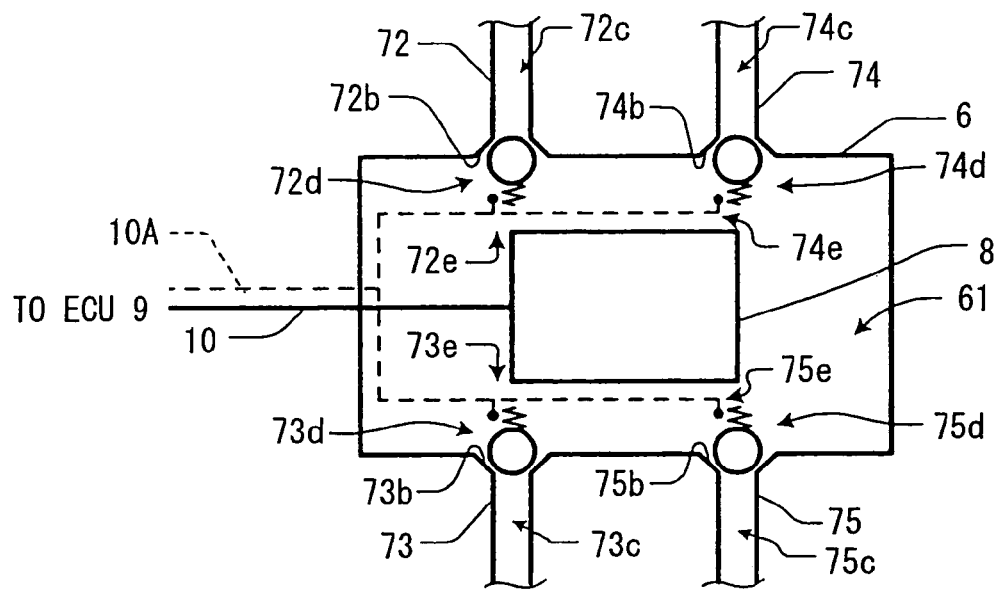
FIG. 6A is a schematic view showing an interior of a tube combination housing in the case where no collision occurs according to a third embodiment of the present invention.
Figure 6B:
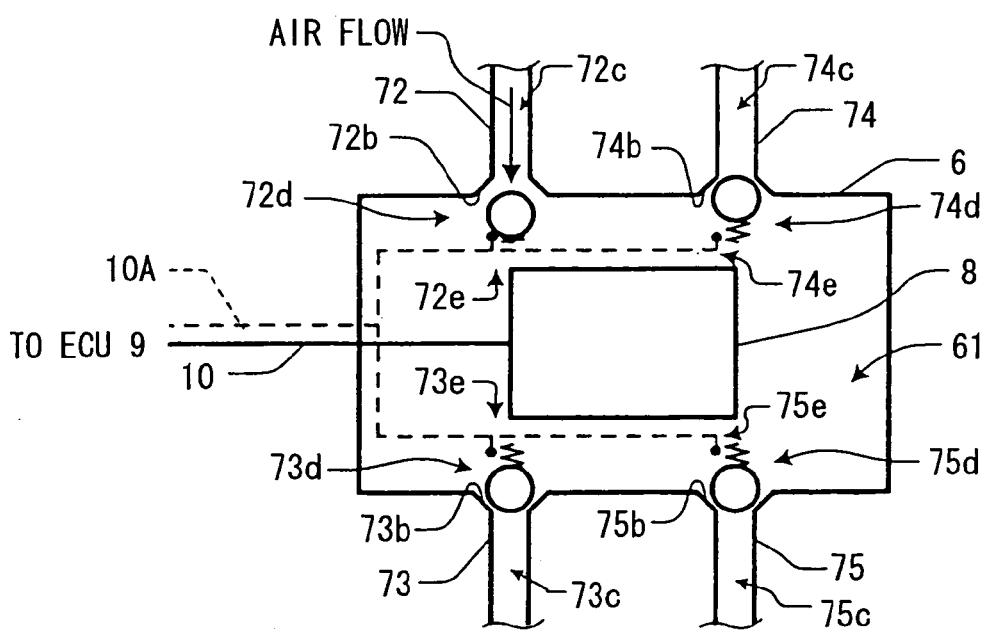
FIG. 6B is a schematic view showing the interior of the tube combination housing in the case where a collision occurs according to the third embodiment.

FIG. 6A shows the interior of the housing 6 when no collision occurs, and FIG. 6B shows the interior of the housing 6 when a collision with the door 2 occurs.

Referring to FIGS. 6A and 6B, the valve members 72d-75d are respectively positioned at the ends 72b-75b of the tubes 72-75, which are connected with the housing 6. The valve members 72d-75d and the switches 72e-75e can be arranged in the housing 6. The switches 72e-75e become ON/OFF respectively responding to opening/closing of the valve members 72d-75d. In this case, when the valve member 72d-75d is opened due to the air flow from the door 2-5 toward the housing 6, the switch 72e-75e will become ON so that electrical signals are generated and inputted to the collision detection ECU 9 through a wire 10A or the like.

For example, when the collision occurs at the door 2, air will flow from the space 2c in the door 2 toward the housing 6 through the tube 72. In this case, referring to FIG. 6B, the valve member 72d deviates from the end 72b of the tube 72 to become open, so that the switch 72e is ON. Based on the detection signal from the switch 72e, the collision at the door 2 can be determined.

In this case, the collision detection ECU 9 determines whether or not there occurs the collision of the vehicle based on the signals from the pressure sensor 8 through the wire 10, and determines which of the doors 2-5 collides with the obstacle according to the signals from the switches 72e-75e through the wire 10A. Therefore, the airbags 12-15 can be selectively actuated.

About the collision detection system, what has not been described in the third embodiment is the substantially same with the first embodiment.

Other Embodiments

Although the present invention has been fully described in connection with the preferred embodiments thereof with reference to the accompanying drawings, it is to be noted that various changes and modifications will become apparent to those skilled in the art.

In the first embodiment, in the case where it is determined that there occurs the collision at one of the doors 2-5, all of the airbags 12-15 will be actuated. However, the vehicle can be also further provided with an acceleration sensor (not shown). Based on the output of the acceleration sensor, it is determined that there occurs the collision at the vehicle right side or the vehicle left side. Thus, it becomes possible to selectively actuate the airbags 12 and 14 which are arranged at the vicinities of the doors 2 and 4 of the vehicle right side, or the airbags 13 and 15 which are arranged at the vicinities of the doors 3 and 5 of the vehicle left side.

Moreover, in the above-described embodiments, the pressure detection unit 8 is provided to detect the variation in air status in the housing 6. However, other detection unit can be also used to detect the variation in the air status in the housing 6.

For example, a flow-rate detection unit which is capable of detecting the flow rate of air in the housing 6, can be used as a substitute for the pressure detection unit. For example, in the case where there occurs the collision at the door 2 or the like, the interior capacity of the space 2c of the door 2 will decrease. Thus, air flows from the space 2c in the door 2 toward the space 61 in the housing 6, through the tube 72 which communicates the space 2c with the space 61. In this case, the flow-rate detection unit can be arranged in the housing 6 to detect the variation of the air flow rate in the housing 6 and generate the corresponding signals. Therefore, the collision detection ECU 9 can determine whether or not there occurs the collision at the vehicle side surface, based on the signals from the flow-rate detection unit.

Alternatively, a sound detection unit which is capable of detecting the sound in the housing 6 can be also used as a substitute for the pressure detection unit. For example, when there occurs the collision at the door 2, the sound will be caused due to the metal deformation of the door 2 or the like. The sound will be transferred to the housing 6 from the door 2, through the tube 72 which communicates the space 2c in the door 2 with the space 61 in the housing 6. In this case, the sound detection unit detects the sound transferred into the space 61 of the housing 6 and generates the corresponding signals. Therefore, the collision detection ECU 9 can determine whether or not there occurs the collision at the vehicle side surface, based on the signals from the sound detection unit.

More alternatively, a temperature detection unit can be also used as a substitute for the pressure detection unit. For example, when there occurs the collision at the door 2, the interior capacity of the door 2 will decrease so that the air pressure in the space 2c increases. The air pressure increase of the space 2c of the door 2 can be transferred to the space 61 in the housing 6 through the tube 72, so that the air temperature in the housing 6 becomes high. In this case, the temperature detection unit detects the air temperature variation in the housing 6 and generates the corresponding signals. Therefore, the collision detection ECU 9 can determine whether or not there occurs the collision at the vehicle side surface, based on the signals from the temperature detection unit.

Furthermore, the housing 6 in which the detection unit is arranged can be also connected with the substantially closed spaces (of hollow members) which are arranged at the vehicle periphery portion other than the vehicle side surface. For example, the hollow members having the substantially closed spaces can be arranged at the front portion and the rear portion of the vehicle, for a detection of a front-rear-direction collision of the vehicle.

Moreover, the collision detection ECU 9 and the airbag ECU can be also constructed of the single ECU. That is, the single ECU functions as the collision detection ECU 9 for determining whether or not there occurs the collision of the vehicle, and the airbag ECU for outputting the actuation signal for deploying the side airbags 12-15.

Moreover, in the case where the two housings 6a and 6b are arranged in the vehicle with reference to FIG. 5, the flow detection units can be also provided. In this case, for example, the valve members 72d, 74d and the opening/closing detection members 72e, 74e can be arranged in the housing 6a which are communicated with the spaces 2c and 4c of the doors 2 and 4. The valve members 73d, 75d and the opening/closing detection members 73e, 75e can be arranged in the housing 6b which are communicated with the spaces 3c and 5c of the doors 3 and 5. Thus, the collision detection ECU 9 can further determine which of the doors 2-5 there occurs the collision at, based on the detection signals from the opening/closing detection members 72e-75e.

Such changes and modifications are to be understood as being in the scope of the present invention as defined by the appended claims.

What is claimed is:

1. A collision detection system for a vehicle, comprising:
   a plurality of doors of the vehicle, each of which is arranged at a periphery portion of the vehicle and defines therein a substantially closed space;
   a housing which defines therein a substantially closed space;
   a plurality of transferring members for respectively communicating the spaces in the doors of the vehicle with the space in the housing;
   a single detection sensor which is arranged in the housing to detect a status of air in the housing; and
   a control unit for determining whether or not there occurs a collision of the vehicle based on detection signals from the detection sensor.

2. The collision detection system according to claim 1, wherein
   the detection sensor is a pressure detection sensor for detecting a pressure of the air in the housing.

3. The collision detection system according to claim 1, wherein
   the detection sensor is a flow-rate detection sensor for detecting a flow rate of the air in the housing.

4. The collision detection system according to claim 1, wherein
   the detection sensor is a sound detection sensor for detecting a sound in the housing.

5. The collision detection system according to claim 1, wherein
   the detection sensor is a temperature detection sensor for detecting a temperature of the air in the housing.

6. The collision detection system according to claim 1, wherein
   each of the transferring members is substantially tubular and has two ends which are open, one end being communicated with the space in each of the doors of the vehicle and another end being communicated with the space in the housing.

7. The collision detection system according to claim 6, further comprising
   a plurality of flow detection units each positioned at the other end of each of the transferring members to detect air flow from each of the doors of the vehicle toward the housing.

8. The collision detection system according to claim 7, wherein
   each of the flow detection units includes:

a valve member which is arranged at the other end of each of the transferring members, the valve member becoming open due to the air flow from each of the doors of the vehicle toward the housing; and an opening/closing detection member which detects opening/closing of the valve member.

9. The collision detection system according to claim 8, wherein the control unit further determines which of the doors of the vehicle there occurs the collision at, based on detection signals from the opening/closing detection members.

10. The collision detection system according to claim 8, wherein the opening/closing detection member is a switch which becomes ON when the valve member is open.

11. The collision detection system according to claim 1, wherein the doors of the vehicle are arranged at a right side surface and a left side surface of the vehicle.

12. A collision detection system for a vehicle, comprising:

a plurality of hollow members, each of which is arranged at a periphery portion of the vehicle and defines therein a substantially closed space;

a single housing which defines therein a substantially closed space;

a plurality of transferring members for respectively communicating the spaces in the hollow members with the space in the housing;

a single detection unit which is arranged in the housing to detect a status of air in the housing; and a control unit for determining whether or not there occurs a collision of the vehicle based on detection signals from the detection unit, wherein;

all of the transferring members are connected with the single housing.

13. A collision detection system for a vehicle, comprising:

a plurality of hollow members, each of which is arranged at a periphery portion of the vehicle and defines therein a substantially closed space;

a plurality of housings, each of which defines therein a substantially closed space;

a plurality of transferring members for respectively communicating the spaces in the hollow members with the space in the housings;

a plurality of detection units which are arranged in the housings to detect a status of air in each of the housings; and a control unit for determining whether or not there occurs a collision of the vehicle based on detection signals from the detection units, wherein;

a number of the housings being the same with that of the detection units and being smaller than that of the hollow members; and the housings are shared by the transferring members to be respectively connected with the different transferring members.

14. A collision detection system for a vehicle, comprising:

a plurality of hollow members, each of which is arranged at a periphery portion of the vehicle and defines therein a substantially closed space;

at least one housing which defines therein a substantially closed space;

a plurality of transferring members for respectively communicating the spaces in the hollow members with the space in the housing, each of the transferring members is substantially tubular and has two ends which are open, one end being communicated with the space in each of the hollow members and another end being communicated with the space in the housing;

at least one detection unit which is arranged in the housing to detect a status of air in the housing;

a control unit for determining whether or not there occurs a collision of the vehicle based on detection signals from the detection unit; and a plurality of flow detection units each positioned at the other end of each of the transferring members to detect air flow from each of the hollow members toward the housing, wherein;

each of the flow detection units includes:

a valve member which is arranged at the other end of each of the transferring members, the valve member becoming open due to the air flow from each of the hollow members toward the housing; and an opening/closing detection member which detects opening/closing of the valve member.

15. The collision detection system according to claim 14, wherein the control unit further determines which of the hollow members there occurs the collision at, based on detection signals from the opening/closing detection members.

16. The collision detection system according to claim 14, wherein the opening/closing detection member is a switch which becomes ON when the valve member is open.

* * * * *